(12) United States Patent
Chandra Sekar Rao et al.

(10) Patent No.: US 11,188,930 B2
(45) Date of Patent: Nov. 30, 2021

(54) DYNAMICALLY DETERMINING CUSTOMER INTENT AND RELATED RECOMMENDATIONS USING DEEP LEARNING TECHNIQUES

(71) Applicant: EMC IP Holding Company LLC, Hopkinton, MA (US)

(72) Inventors: Venkata Chandra Sekar Rao, Bangalore (IN); Sumit Gupta, Bangalore (IN); Kirti Khade, Bangalore (IN); Kalpana Razdan, Bangalore (IN); Diwahar Sivaraman, Bangalore (IN)

(73) Assignee: EMC IP Holding Company LLC, Hopkinton, MA (US)

(*) Notice: Subject to any disclaimer, the term of this patent is extended or adjusted under 35 U.S.C. 154(b) by 296 days.

(21) Appl. No.: 16/046,402

(22) Filed: Jul. 26, 2018

(65) Prior Publication Data
US 2020/0034858 A1 Jan. 30, 2020

(51) Int. Cl.
*G06Q 30/02* (2012.01)
*G06N 3/08* (2006.01)
*G06F 16/9535* (2019.01)

(52) U.S. Cl.
CPC ..... *G06Q 30/0202* (2013.01); *G06F 16/9535* (2019.01); *G06N 3/08* (2013.01)

(58) Field of Classification Search
USPC ....................................................... 705/7.31
See application file for complete search history.

(56) References Cited

U.S. PATENT DOCUMENTS 7,836,051 B1 11/2010 Mason
9,734,503 B1* 8/2017 Gargi ................. G06Q 30/0631
(Continued)

OTHER PUBLICATIONS

Sakar et al., Real-time prediction of online shoppers' purchasing intention using multilayer perception and LTSM recurrent neural networks, Jul. 18, 2017, Neural Computing and Applications (Year: 2017).*

(Continued)

*Primary Examiner* — Timothy Padot
*Assistant Examiner* — Allison M Neal
(74) *Attorney, Agent, or Firm* — Ryan, Mason & Lewis, LLP (57) ABSTRACT

Methods, apparatus, and processor-readable storage media for dynamically determining customer intent and related recommendations using deep learning techniques are provided herein. An example computer-implemented method includes generating a prediction as to whether a user will order a particular offering during a user browsing session by applying one or more deep learning techniques to browsing session data derived from the user browsing session; mapping the user browsing session to one or more pre-established procurement user types by comparing the browser session data to data pertaining to multiple pre-established procurement user types; determining a recommendation of one or more offerings distinct from the particular offering, wherein determining the recommendation is based at least in part on the generated prediction and the mapping of the user browsing session to one or more of the multiple pre-established procurement user types; and outputting, within the user browsing session, the recommendation to the user.

20 Claims, 7 Drawing Sheets

(56) References Cited

U.S. PATENT DOCUMENTS

| | | | |
|---|---|---|---|
| 9,916,611 B2 | 3/2018 | Hueter et al. | |
| 10,354,184 B1* | 7/2019 | Vitaladevuni | G06Q 30/0251 |
| 2002/0010625 A1* | 1/2002 | Smith | G06Q 30/0631 |
| | | | 705/14.52 |
| 2002/0161664 A1* | 10/2002 | Shaya | G06Q 30/0254 |
| | | | 705/7.31 |
| 2008/0306830 A1* | 12/2008 | Lasa | G06Q 30/02 |
| | | | 705/14.16 |
| 2012/0271819 A1* | 10/2012 | Qiu | G06F 16/686 |
| | | | 707/723 |
| 2013/0282430 A1* | 10/2013 | Kannan | G06Q 30/06 |
| | | | 705/7.29 |
| 2015/0220972 A1* | 8/2015 | Subramanya | G06Q 30/0246 |
| | | | 705/14.45 |
| 2015/0278837 A1* | 10/2015 | Lahav | G06Q 30/0204 |
| | | | 705/7.33 |
| 2015/0339572 A1* | 11/2015 | Achin | G06F 9/5011 |
| | | | 706/46 |
| 2016/0005097 A1* | 1/2016 | Hsiao | G06Q 30/0631 |
| | | | 705/26.7 |
| 2017/0206581 A1* | 7/2017 | Feierfeil | G06Q 30/0631 |
| 2017/0293836 A1* | 10/2017 | Li | G06N 3/0445 |
| 2019/0087691 A1* | 3/2019 | Jelveh | G06K 9/6254 |

OTHER PUBLICATIONS

Wikipedia, Google Analytics, Jul. 12, 2018.
ClickTale, Solutions, https://web.archive.org/web/20180717200013/https://www.clicktale.com/solutions/, Jul. 17, 2018.
HeatMap, https://web.archive.org/web/20180713204807/https://heatmap.com/, Jul. 13, 2018.
Hublo, https://web.archive.org/web/20180413140130/http://www.hublo.com/, Apr. 13, 2018.

* cited by examiner

```
def RNN(x, n_hidden, vocab_size):
    # RNN output node weights and biases
    # step 2
    weight = tf.Variable(tf.random_normal([n_hidden, vocab_size]))
    bias = tf.Variable(tf.random_normal([vocab_size]))

# reshape to [1, n_input]
    # step 3
    x = tf.reshape(x, [-1, n_input])
    x = tf.split(x, n_input, 1)

# step 4
    rnn_cell = rnn.BasicLSTMCell(n_hidden)

# generate prediction
    # step 5
    outputs, states = rnn.static_rnn(rnn_cell, x, dtype=tf.float32)

# step 6
    return tf.matmul(outputs[-1], weight) + bias pred = RNN(x, n_hidden, vocab_size)

Loss and optimizer
# step 7
cost = tf.reduce_mean(tf.nn.softmax_cross_entropy_with_logits(logits=pred, labels=y))
optimizer = tf.train.RMSPropOptimizer(learning_rate=learning_rate).minimize(cost)

# Model evaluation
# step 8
correct_pred = tf.equal(tf.argmax(pred,1), tf.argmax(y,1))
accuracy = tf.reduce_mean(tf.cast(correct_pred, tf.float32))
```

FIG. 6

```
initialize y_i = Y_I for i ∈ I
REPEAT
    compute SVM solution w, b for data set with imputed labels
    compute outputs f_i = <w, x_i> + b for all x_i in positive bags
    set y_i = sgn(f_i) for every i ∈ I, Y_I = 1
    FOR (every positive bag B_I)
        IF (∑_{i∈I} (1 + y_i)/2 == 0)
            compute i* = arg max_{i∈I} f_i
            set y_{i*} = 1
        END
    END
WHILE (imputed labels have changed)
OUTPUT (w, b)
```

FIG. 7

GENERATING A PREDICTION AS TO WHETHER A USER WILL ORDER A PARTICULAR OFFERING DURING A USER BROWSING SESSION BY APPLYING DEEP LEARNING TECHNIQUES TO BROWSING SESSION DATA DERIVED FROM THE USER BROWSING SESSION — 700

MAPPING THE USER BROWSING SESSION TO ONE OR MORE PRE-ESTABLISHED PROCUREMENT USER TYPES BY COMPARING THE BROWSER SESSION DATA TO DATA PERTAINING TO MULTIPLE PRE-ESTABLISHED PROCUREMENT USER TYPES — 702

DETERMINING A RECOMMENDATION OF ONE OR MORE OFFERINGS DISTINCT FROM THE PARTICULAR OFFERING, BASED AT LEAST IN PART ON THE GENERATED PREDICTION AND THE MAPPING OF THE USER BROWSING SESSION TO ONE OR MORE PROCUREMENT USER TYPES — 704

OUTPUTTING, WITHIN THE USER BROWSING SESSION, THE RECOMMENDATION TO THE USER — 706

DYNAMICALLY DETERMINING CUSTOMER INTENT AND RELATED RECOMMENDATIONS USING DEEP LEARNING TECHNIQUES

FIELD

The field relates generally to information processing systems, and more particularly to techniques for enhancing user browsing experiences using such systems.

BACKGROUND

For many businesses and other enterprises, efficient and successful marketing and customer outreach faces significant challenges. For example, in connection with Internet searches using a search engine, a common customer tool, click-through rates on the first page of such searches are typically low, indicating that customer and potential customers often are less likely to identify and/or visit the websites of particular enterprises. Additionally, enterprises routinely lack prior knowledge pertaining to browsing sessions for known customers, and also lack analytic capabilities for forecasting which marketing campaign(s) should be presented to unknown or unregistered customers.

SUMMARY

Illustrative embodiments of the invention provide techniques for dynamically determining customer intent and related recommendations using deep learning methods. An exemplary computer-implemented method can include generating a prediction as to whether a user will order at least one particular offering during a user browsing session of one or more web pages of an enterprise, wherein generating the prediction comprises applying one or more deep learning techniques to browsing session data derived from the user browsing session. Such a method can also include mapping the user browsing session to one or more of multiple pre-established procurement user types by comparing the browser session data to data pertaining to the multiple pre-established procurement user types, and determining a recommendation of one or more offerings distinct from the at least one particular offering, wherein determining the recommendation is based at least in part on the generated prediction and the mapping of the user browsing session to one or more of the multiple pre-established procurement user types. Further, such a method can include outputting, within the user browsing session, the recommendation to at least the user.

Illustrative embodiments can provide significant advantages relative to conventional targeted marketing arrangements. For example, challenges associated with the limitations of static marketing approaches are overcome through the use of deep learning techniques to dynamically determine one or more intentions of a customer within a current web browsing session. Such deep learning techniques facilitate prediction of whether the customer will convert one or more browsing actions into an order, and also facilitate dynamically recommending one or more additional products beyond merely alternatives to the particular product in question.

These and other illustrative embodiments described herein include, without limitation, methods, apparatus, systems, and computer program products comprising processor-readable storage media.

DETAILED DESCRIPTION

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
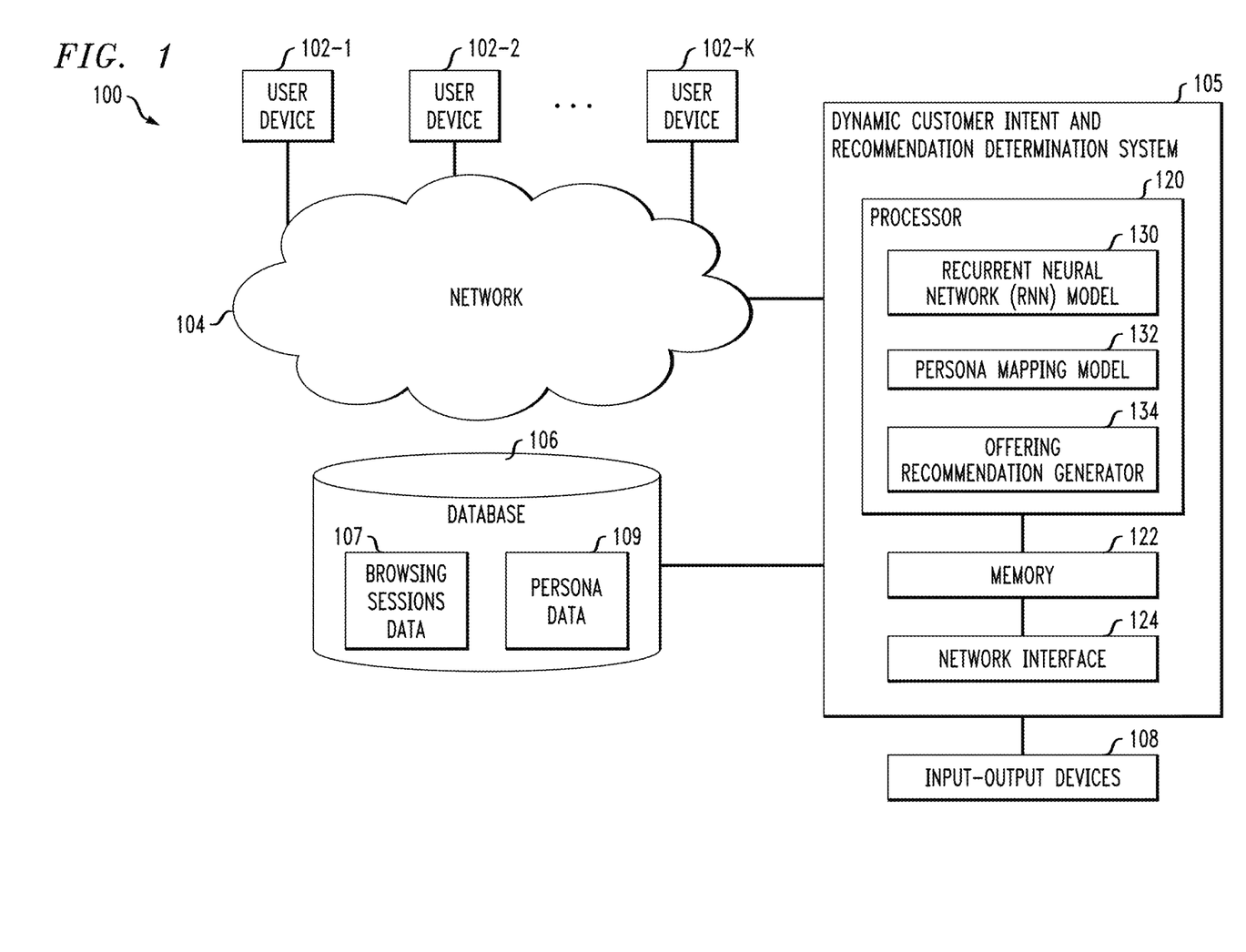
FIG. 1 shows an information processing system configured for dynamically determining customer intent and related recommendations in an illustrative embodiment of the invention.

FIG. 1 shows a computer network (also referred to herein as an information processing system) 100 configured in accordance with an illustrative embodiment of the invention. The computer network 100 comprises a plurality of user devices 102-1, 102-2, . . . 102-K, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to the network 104 is a dynamic customer intent and recommendation determination system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

The dynamic customer intent and recommendation determination system 105 has an associated database 106 configured to store browsing sessions data 107 and persona data 109 illustratively comprising information pertaining to various user web browsing sessions and historical information pertaining to multiple established personas, respectively.

The database 106 in the present embodiment is implemented using one or more storage systems associated with the dynamic customer intent and recommendation determination system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the dynamic customer intent and recommendation determination system 105 are input-output devices 108, which illustratively comprise keyboards, displays or other types of input-output devices in any combination. Such input-output devices are used to support one or more user interfaces to the dynamic customer intent and recommendation determination system 105, as well as to support communication between the dynamic customer intent and recommendation determination system 105 and other related systems and devices not explicitly shown.

The dynamic customer intent and recommendation determination system 105 in the FIG. 1 embodiment is assumed to be implemented using at least one processing device. Each such processing device generally comprises at least one processor and an associated memory, and implements one or more functional modules for controlling certain features of the dynamic customer intent and recommendation determination system 105.

More particularly, the dynamic customer intent and recommendation determination system 105 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

One or more embodiments of the invention include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the dynamic customer intent and recommendation determination system 105 to communicate over the network 104 with the user devices 102, and illustratively comprises one or more conventional transceivers.

The processor 120 further comprises an RNN model 130, a persona mapping model 132, and an offering recommendation generator 134.

It is to be appreciated that this particular arrangement of modules 130, 132, and 134 illustrated in the processor 120 of the FIG. 1 embodiment is presented by way of example only, and alternative arrangements can be used in other embodiments. For example, the functionality associated with the modules 130, 132, and 134 in other embodiments can be combined into a single module, or separated across a larger number of modules. As another example, multiple distinct processors can be used to implement different ones of the modules 130, 132, and 134 or portions thereof.

At least portions of the RNN model 130, persona mapping model 132, and offering recommendation generator 134 may be implemented at least in part in the form of software that is stored in memory 122 and executed by processor 120.

It is to be understood that the particular set of elements shown in FIG. 1 for dynamically determining customer intent and related recommendations involving user devices 102 of computer network 100 is presented by way of illustrative example only, and in other embodiments additional or alternative elements may be used. Thus, another embodiment may include additional or alternative systems, devices and other network entities, as well as different arrangements of modules and other components.

By way of example, in other embodiments, the dynamic customer intent and recommendation determination system 105 can be eliminated and associated elements such as RNN model 130, persona mapping model 132, and offering recommendation generator 134 can be implemented elsewhere in the computer network 100.

An exemplary process utilizing RNN model 130, persona mapping model 132, and offering recommendation generator 134 of the dynamic customer intent and recommendation determination system 105 in computer network 100 will be described in more detail with reference to the flow diagram of FIG. 7.

As detailed herein, one or more embodiments of the invention include predicting the intention of a user during a web browsing session as to whether the user's browsing activities will be converted into an order of one or more products/services or not. Additionally, such an embodiment includes recommending, during the web browsing session and based at least in part on the intention prediction, one or more products/services to reduce bounce rates and increase conversion rates, revenue, etc.

One or more embodiments of the invention include monitoring and tracking user search/browsing patterns such as, for example, time spent per product, time spent per page, search frequency, number of return visits, etc. Additionally, such an embodiment can also include learning the pages visited by converting users (that is, users who ultimately converted browsing activity into one or more orders and/or purchases via a related website) prior to such conversion-related transactions, and indexing the learned pages and one or more pages related thereto.

At least one embodiment of the invention includes leveraging such information to predict whether a particular user will order and/or purchase one or more particular products/services related to an ongoing web browsing session of that user. Additionally, if it is predicted that the user is not expected to order and/or purchase the one or more offerings in question, then one or more embodiments of the invention can include utilizing current and historical data (pertaining to both this particular user and one or more other users) to classify and/or profile the user as one or more user types or personas. Such a classification of the user can then be leveraged to dynamically recommend one or more other products/services to the user (in the web browsing session) that the user may be likely to order/purchase. Such other products can include distinct and/or supplementary products to the offerings analyzed as part of the intention prediction, rather than simply generic or alternative versions of the offering in question.

As used herein, personas refer to representations of a target audience(s) or type of procurement user of a given product, service, or other offering. Personas can additionally be built within the context of one or more particular procurement destinations (such as an enterprise website, for example). In determining one or more persona classifications, at least one embodiment of the invention can include analyzing properties of a visit to a website during a browsing session such as internet protocol (IP) address, cookie information, whether the user is logged-in or identified as a guest user, geographic parameters of the user, temporal parameters of the browsing session, etc. In one or more embodiments of the invention, the recommending of products/services can be based on a user's persona classification, and not based on alternative versions of the offering in question.

As web browsing can be inherently sequential in nature, at least one embodiment of the invention include utilizing RNNs in analyzing web browsing sequences. By way merely of illustration, such sequences can include actions such as the means by which a user accessed/entered a website (direct load, email-click, advertisement-click, etc.), which product/service pages are visited by the user, whether or not the user accessed any product/service reviews, the percentage of a web page read and/or viewed by the user, the amount of time spent on a given web page, whether a product/service has been marked for order/purchase (for example, whether a product/service has been added to a shopping cart within the browsing session), etc. Additionally, such an embodiment additionally monitors and/or tracks whether or not a user ultimately converts his or her web browsing activities into an order/purchase. If a user does not ultimately make the conversion, one or more embodiments of the invention can monitor and/or track whether or not the user returns to one or more relevant web pages after some period of time has elapsed.

Figure 2:
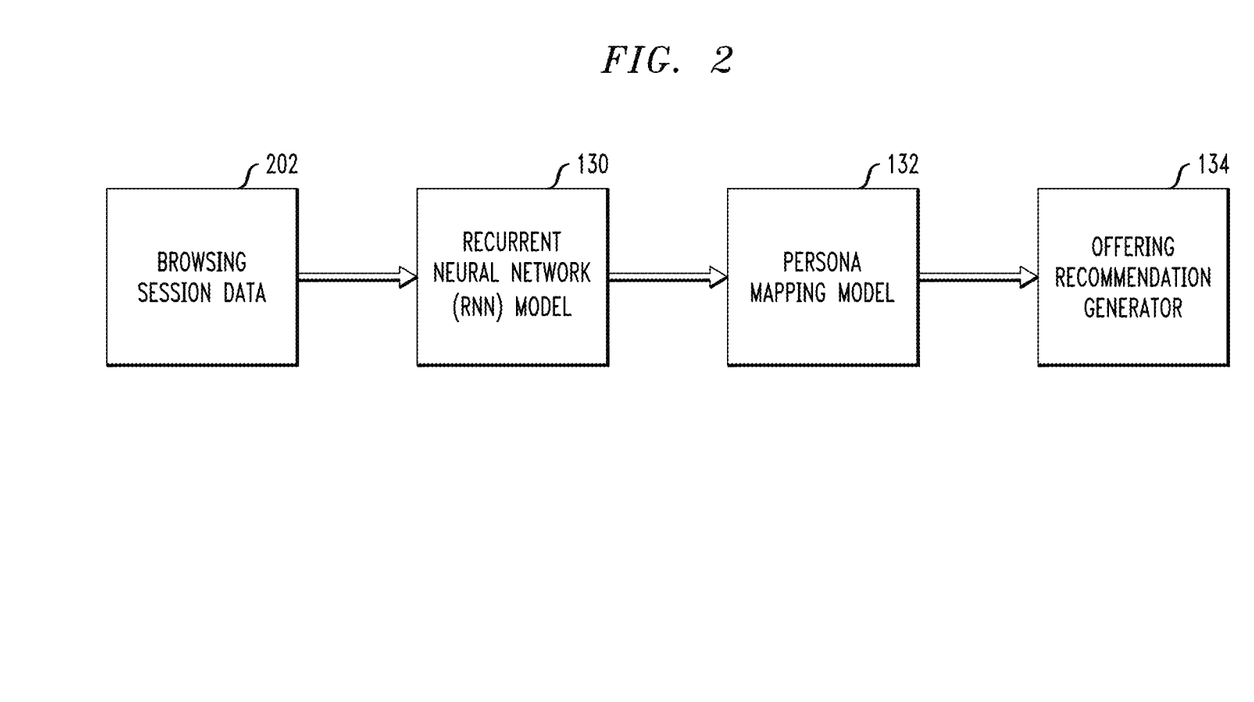
FIG. 2 shows system architecture for a dynamic customer intent and recommendation system in an illustrative embodiment.

FIG. 2 shows system architecture for a dynamic customer intent and recommendation system in an illustrative embodiment. By way of illustration, FIG. 2 depicts browsing session data 202, which are used by RNN model 130 to predict a user's intention to convert browsing session actions into one or more orders. Based on this prediction, persona mapping model 132 identifies one or more pre-established personas that can be used to classify the user in question, and the one or more identified personas are then used by offering recommendation generator 134 to generate a recommendation of one or more additional products/services to the user during the browsing session.

Figure 3:
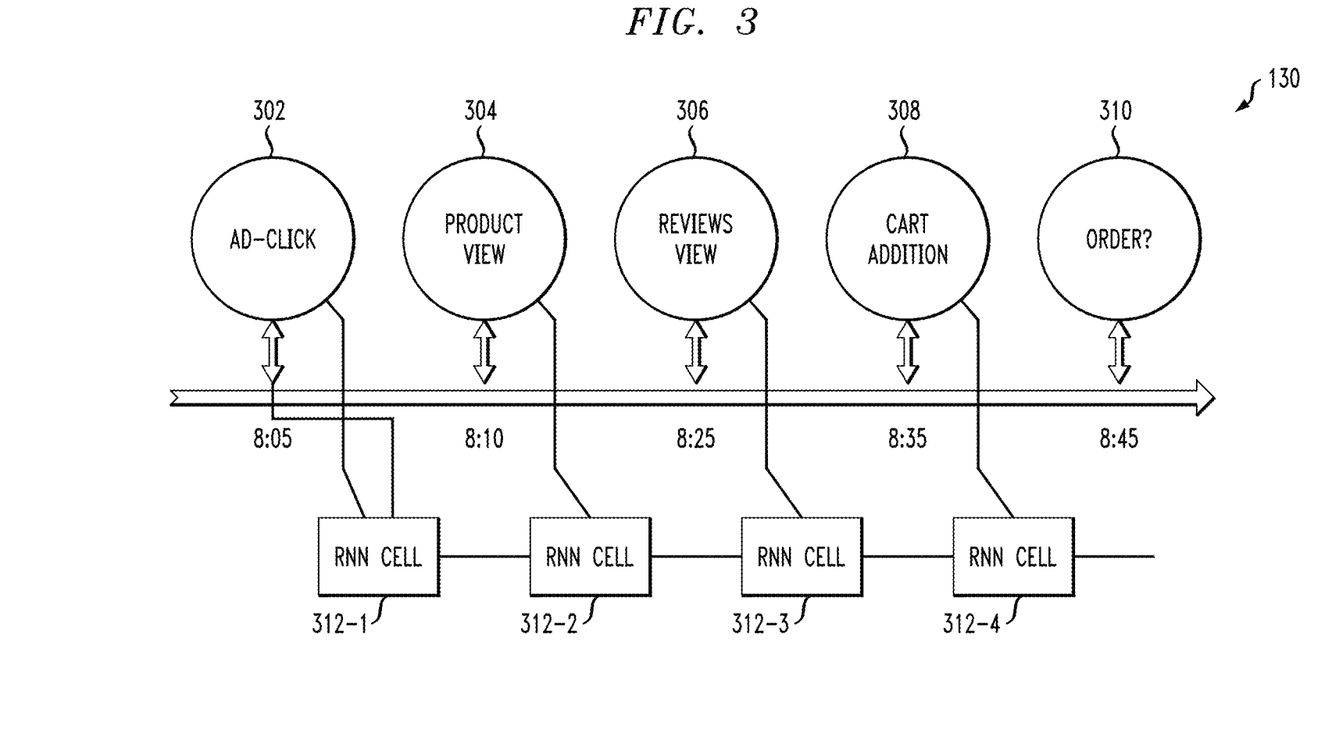
FIG. 3 shows a recurrent neural network model in an illustrative embodiment.

FIG. 3 shows a recurrent neural network model 130 in an illustrative embodiment. By way of illustration, FIG. 3 depicts a sequence of browsing session events that include accessing a web page via an advertising-click (ad-click) 302 at a first time instance (t=8:05, for example), viewing a product 304 on the web page at a second time instance (t=8:10), viewing one or more reviews related to the product 306 at a third time instance (t=8:25), and adding one or more items to a shopping cart associated with the web page 308 at a fourth time instance (t=8:35). At each event (that is, event 302, event 304, event 306 and event 308) an RNN cell (312-1, 312-2, 312-3 and 312-4, respectively) analyzes data pertaining to the event and builds such learning towards a prediction, in event 310, of whether the user will carry out an order of the product.

Figure 4:
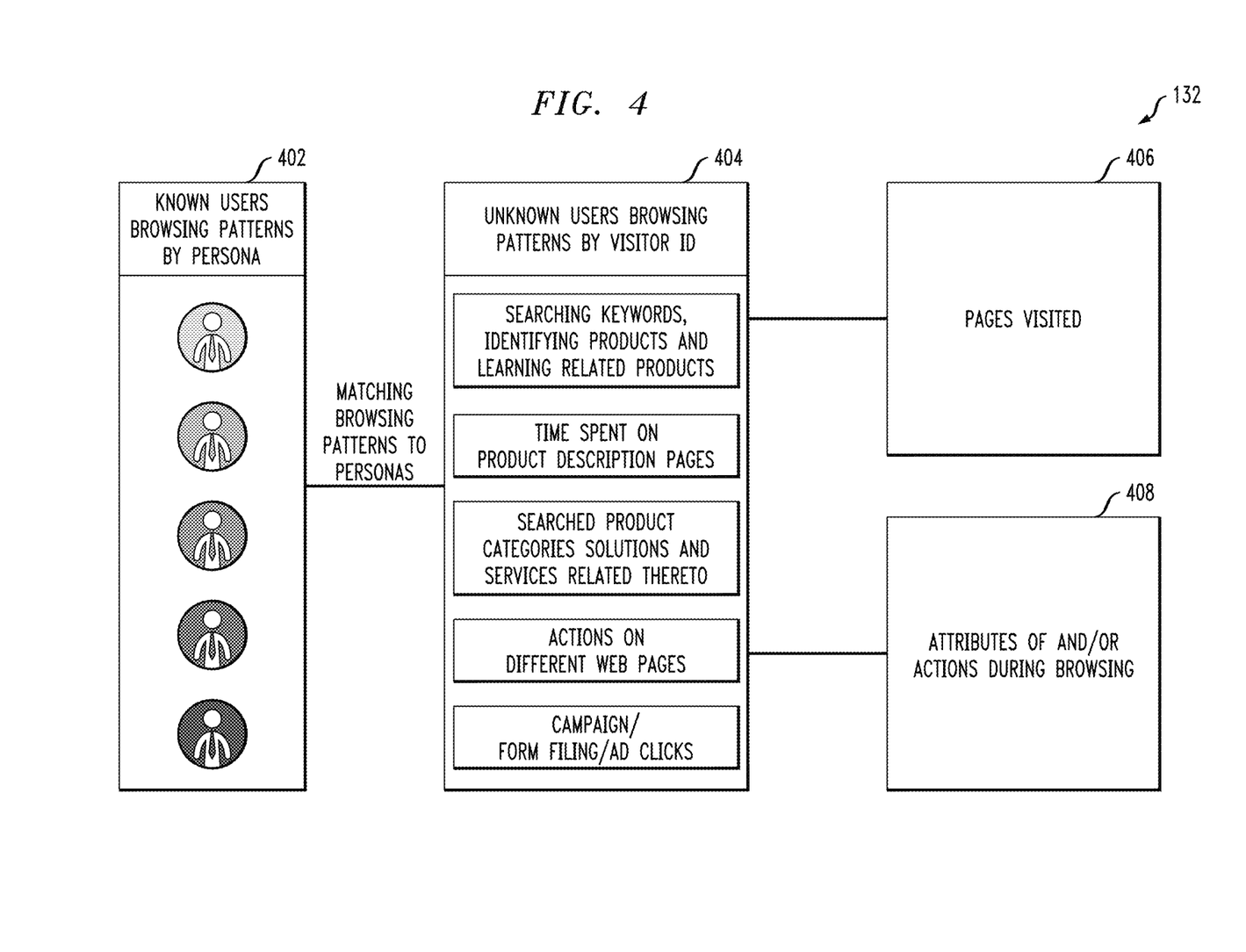
FIG. 4 shows a persona identification model in an illustrative embodiment.

FIG. 4 shows a persona identification model 132 in an illustrative embodiment. As detailed herein, for every web browsing session, one or more embodiments of the invention include learning patterns of actions performed by users/visitors, and then such embodiments further include recommending products and/or pages to be visited based on matched (converted) user personas. A model such as model 132 can be trained (based, for example, on the list of pages a user/visitor visits and actions performed during a conversion process) to understand the persona of a visitor browsing a given website. Examples of such personas can include the following: Persona1: Easily frustrated, and opinionated; Persona2: Responds to offers and deals; Persona3: Researches many aspects of a product; Persona4: Returns items at a much higher level than most users; Persona5: A high-value lapsed purchaser; Persona6: Shopped previously but will not and/or has not returned; and Persona7: Views emails, clicks-through to website and looks into suggested products.

Accordingly, FIG. 4 depicts known user browsing patterns by persona 402, which can be used to match browsing patterns to personas for unknown user browsing patterns by user/visitor identifier (ID) 404. Determining such browsing patterns, as illustrated in FIG. 4, can include searching key words, determining an amount of time spent on product description web pages, identifying searched-for product categories and related solutions/services, monitoring actions on different web pages, and access/entrance mechanisms (campaigns, form-filling, ad-clicks, etc.). Such determinations can be based at least in part on captured data such as identity of pages visited 406 by the user(s) and one or more attributes of and/or actions taken during one or more browsing sessions 408.

Further, in at least one embodiment of the invention, and as further detailed in connection with FIG. 6, multivariate SVM can be used to classify personas and calculate the distance to each captured and/or determined (user) data point from the mean of each persona to determine whether the data point belongs to the respective persona or not.

Figure 5:
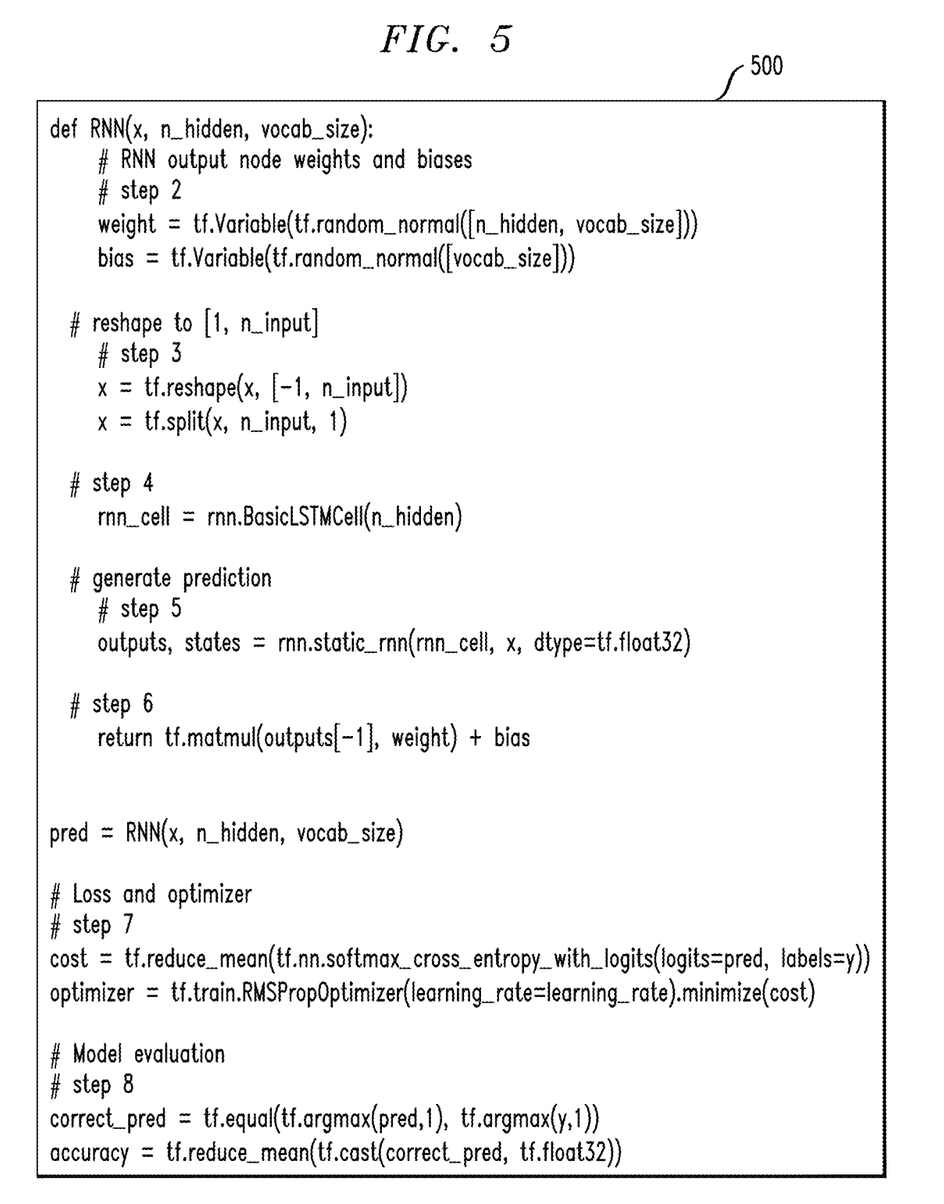
FIG. 5 shows example pseudocode for a recurrent neural network (RNN) model in an illustrative embodiment.

Referring now to FIG. 5, an illustrative embodiment is shown. In this embodiment, pseudocode 500 is executed by or under the control of a processor 120, such as, for example, processor 120 in FIG. 1. For example, the pseudocode 500 may be viewed as comprising a portion of a software implementation of at least part of the RNN model 130 of the FIG. 1 embodiment.

The pseudocode 500 illustrates RNN model pseudo code in an illustrative embodiment. As is to be appreciated, neural networks generally works as follows: input → hidden layer → output. Certain types of input can create certain types of hidden layers, and certain types of hidden layers can create certain types of output layers. Additionally, memory can change this arrangement, wherein memory can indicate that the hidden layer is a combination of input data at a current time-step and a hidden layer of the previous time-step, as follows: (input+prev_hidden) → hidden → output. Further, at least one embodiment of the invention can include implementing multiple time-steps of an RNN pulling information from the previous input layer and/or multiple time-steps with input layer recurrence.

It is to be appreciated that this particular pseudocode shows just one example implementation of an RNN model, and alternative implementations of the process can be used in other embodiments.

Figure 6:
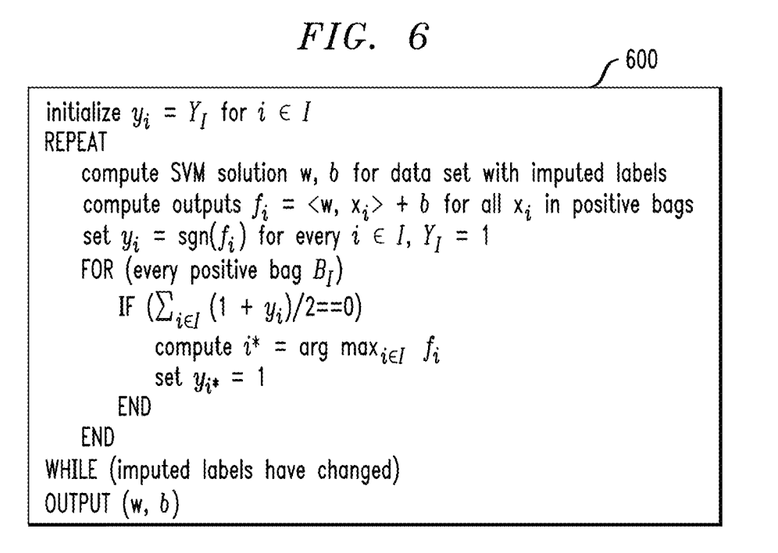
FIG. 6 shows example pseudocode for a support vector machine (SVM) model in an illustrative embodiment.

Additionally, in FIG. 6, another illustrative embodiment is shown. In this embodiment, pseudocode 600 is executed by or under the control of a processor 120, such as, for example, processor 120 in FIG. 1. For example, the pseudocode 600 may be viewed as comprising a portion of a software implementation of at least part of the persona mapping model 132 of the FIG. 1 embodiment.

The pseudocode 600 illustrates SVM model pseudo code in an illustrative embodiment. At least one embodiment of the invention includes calculating, for each of multiple sessions against each persona, the distance from each attribute to a mean value. In such an embodiment, if the calculated distance is less than a given amount, there is a high probability of liking the item bought by the same persona.

It is to be appreciated that this particular pseudocode shows just one example implementation of an SVM model, and alternative implementations of the process can be used in other embodiments.

Figure 7:
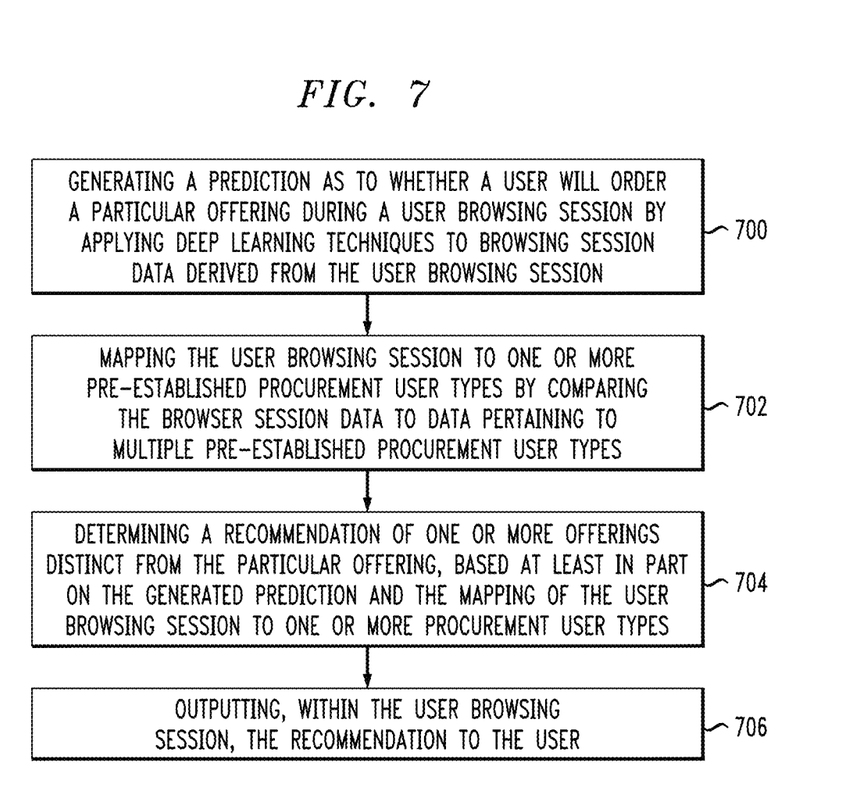
FIG. 7 is a flow diagram of a process for dynamically determining customer intent and related recommendations in an illustrative embodiment.

FIG. 7 is a flow diagram of a process for dynamically determining customer intent and related recommendations in an illustrative embodiment. It is to be understood that this particular process is only an example, and additional or alternative processes can be carried out in other embodiments.

In this embodiment, the process includes steps 700 through 706. These steps are assumed to be performed by the processor 120 utilizing its modules 130, 132, and 134.

Step 700 includes generating a prediction as to whether a user will order at least one particular offering during a user browsing session of one or more web pages of an enterprise, wherein generating the prediction comprises applying one or more deep learning techniques to browsing session data derived from the user browsing session. The one or more deep learning techniques can include an RNN. Also, the one or more deep learning techniques can be based at least in part on browsing session data derived from one or more previous user browsing sessions during which one or more users ordered at least one offering.

Additionally, the browsing session data can include data pertaining to time spent per offering, data pertaining to time spent per web page, data pertaining to one or more browsing frequency patterns, data pertaining to one or more return visits to one or more of the web pages, data pertaining to a manner in which the user accessed the one or more web pages of the enterprise, data pertaining to one or more offering reviews accessed during the user browsing session, data pertaining to one or more of the offerings selected for purchase during the user browsing session (added to a shopping cart, for example), etc.

Step 702 includes mapping the user browsing session to one or more of multiple pre-established procurement user types (also referred to herein as "personas") by comparing the browser session data to data pertaining to the multiple pre-established procurement user types.

Step 704 includes determining a recommendation of one or more offerings distinct from the at least one particular offering, wherein determining the recommendation is based at least in part on the generated prediction and the mapping of the user browsing session to one or more of the multiple pre-established procurement user types. Determining the recommendation can include identifying one or more offerings previously ordered by one or more users belonging to the one or more pre-established procurement user types mapped to the user browsing session.

The one or more offerings distinct from the at least one particular offering can include one or more offerings of a distinct offering category as compared to the at least one particular offering. Additionally, the one or more offerings distinct from the at least one particular offering can include one or more offerings that are supplementary to the at least one particular offering.

Step 706 includes outputting, within the user browsing session, the recommendation to at least the user.

Accordingly, the particular processing operations and other network functionality described in conjunction with the flow diagram of FIG. 7 are presented by way of illustrative example only, and should not be construed as limiting the scope of the invention in any way. Alternative embodiments can use other types of processing operations to detect session-based access anomalies and undertake appropriate remediation actions. For example, the ordering of the process steps may be varied in other embodiments, or certain steps may be performed concurrently with one another rather than serially. Also, as indicated previously, the process steps or subsets thereof may be repeated periodically in conjunction with respective distinct instances of session-based anomaly detection for different user identifiers.

The above-described illustrative embodiments provide significant advantages relative to conventional approaches. For example, some embodiments are configured to proactively identify customer intentions in a web browsing session. These and other embodiments can effectively enable the generation of more successful recommendations, and a related increase in conversion rates.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, as detailed herein, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 8 and 9. Although described in the context of system 100, these platforms may also be used to implement at least portions of other information processing systems in other embodiments.

Figure 8:
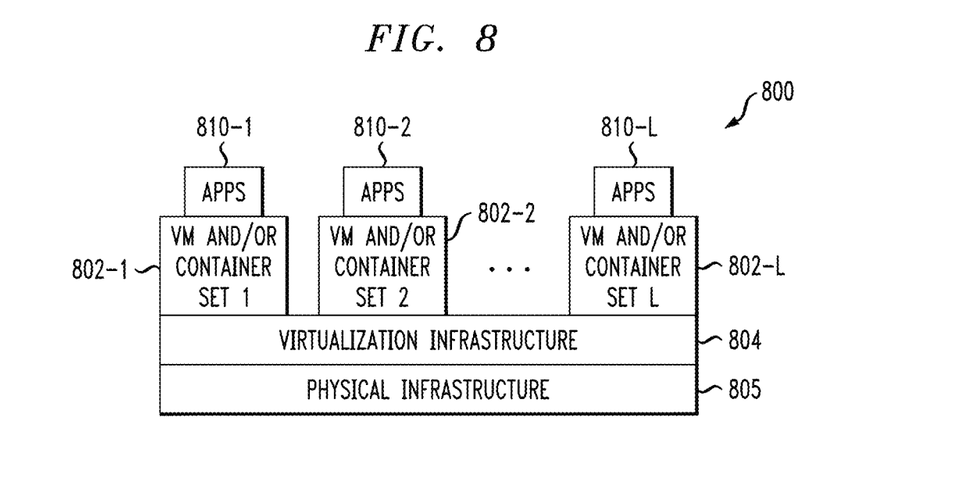
FIGS. 8 and 9 show examples of processing platforms that may be utilized to implement at least a portion of an information processing system in illustrative embodiments.
Figure 9:
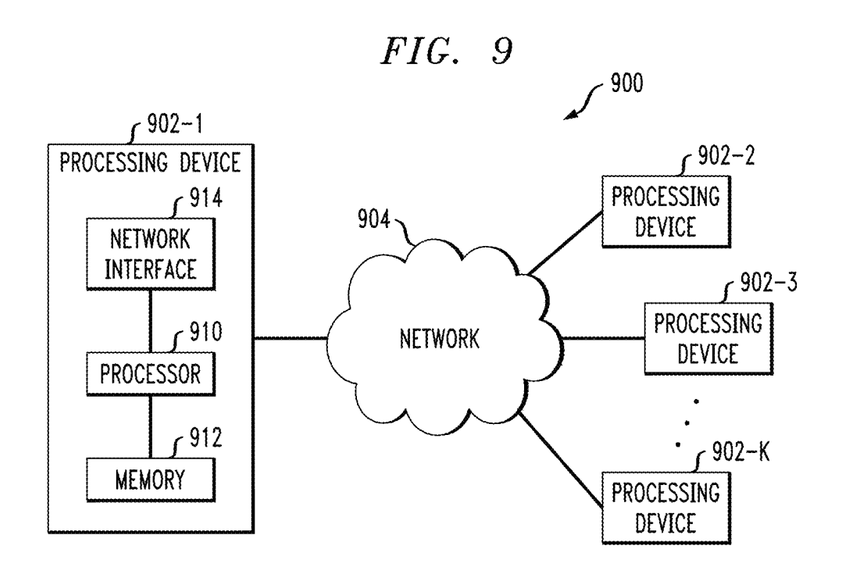

FIG. 8 shows an example processing platform comprising cloud infrastructure 800. The cloud infrastructure 800 comprises a combination of physical and virtual processing resources that may be utilized to implement at least a portion of the information processing system 100. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. Such implementations can provide deduplication estimate generation functionality of the type described above for one or more processes running on a given one of the VMs. For example, each of the VMs can implement deduplication control logic and associated deduplication estimate tables for providing deduplication estimate generation functionality for one or more processes running on that particular VM.

An example of a hypervisor platform that may be used to implement a hypervisor within the virtualization infrastructure 804 is the VMware® vSphere® which may have an associated virtual infrastructure management system such as the VMware® vCenter™. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system. Such implementations can provide deduplication estimate generation functionality of the type described above for one or more processes running on different ones of the containers. For example, a container host device supporting multiple containers of one or more container sets can implement one or more instances of deduplication control logic and associated deduplication estimate tables for use in generating deduplication estimates.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises a portion of system 100 and includes a plurality of processing devices, denoted 902-1, 902-2, 902-3, . . . 902-K, which communicate with one another over a network 904.

The network 904 may comprise any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 902-1 in the processing platform 900 comprises a processor 910 coupled to a memory 912.

The processor 910 may comprise a microprocessor, a microcontroller, an application-specific integrated circuit (ASIC), a field-programmable gate array (FPGA) or other type of processing circuitry, as well as portions or combinations of such circuitry elements.

The memory 912 may comprise random access memory (RAM), read-only memory (ROM) or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include VNX® and Symmetrix MAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. For example, the disclosed techniques are applicable to a wide variety of other types of information processing systems in which it is desirable to provide efficient user web browsing experiences. Also, the particular configurations of system and device elements and associated processing operations illustratively shown in the drawings can be varied in other embodiments. Thus, for example, the particular types of processing platforms, modules, cloud-based systems and virtual resources deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A computer-implemented method comprising:
generating a prediction as to whether a user will order at least one particular offering during a user browsing session of one or more web pages of an enterprise, wherein generating the prediction comprises applying one or more deep learning techniques to browsing session data derived from the user browsing session, and wherein applying the one or more deep learning techniques to the browsing session data comprises processing data pertaining to a sequence of multiple browsing session events, occurring at distinct time instances, using multiple recurrent neural network cells and multiple hidden layers within a recurrent neural network, wherein one or more of the multiple hidden layers comprises a combination of input data at a given time instance and output data from at least one hidden layer associated with at least one previous time instance, and wherein processing comprises:
processing, using a first of the multiple recurrent neural network cells, data and corresponding temporal information pertaining to accessing at least one of the one or more web pages of the enterprise at a first time instance and a percentage of the at least one web page accessed by the user;
processing, using a second of the multiple recurrent neural network cells, data and corresponding temporal information pertaining to viewing the at least one particular offering on the at least one web page at a second time instance subsequent to the first time instance; and
processing, using a third of the multiple recurrent neural network cells, data and corresponding temporal information pertaining adding the at least one particular offering to a virtual shopping cart associated with the one or more web pages of the enterprise at a third time instance subsequent to the second time instance;
mapping the user browsing session to one or more of multiple pre-established procurement user types by comparing the browser session data to data pertaining to the multiple pre-established procurement user types, wherein comparing comprises calculating a distance from each of one or more data points within the browser session data to the mean data point associated with each the of multiple pre-established procurement user types using at least one multivariate support vector machine;

determining a recommendation of one or more offerings distinct from the at least one particular offering, wherein determining the recommendation is based at least in part on the generated prediction and the mapping of the user browsing session to one or more of the multiple pre-established procurement user types, and wherein determining the recommendation based at least in part on the mapping comprises identifying at least one offering purchased by at least one user associated with at least one of the multiple pre-established procurement user types upon a determination that at least one of the calculated distances, related to the at least one pre-established procurement user type, is less than a given amount; and outputting, within the user browsing session, the recommendation to at least the user;

wherein the method is performed by at least one processing device comprising a processor coupled to a memory.

2. The computer-implemented method of claim 1, wherein the browsing session data comprise data pertaining to time spent per offering.

3. The computer-implemented method of claim 1, wherein the browsing session data comprise data pertaining to time spent per web page.

4. The computer-implemented method of claim 1, wherein the browsing session data comprise data pertaining to one or more browsing frequency patterns.

5. The computer-implemented method of claim 1, wherein the browsing session data comprise data pertaining to one or more return visits to one or more of the web pages.

6. The computer-implemented method of claim 1, wherein the browsing session data comprise data pertaining to a manner in which the user accessed the one or more web pages of the enterprise.

7. The computer-implemented method of claim 1, wherein the browsing session data comprise data pertaining to one or more offering reviews accessed during the user browsing session.

8. The computer-implemented method of claim 1, wherein the browsing session data comprise data pertaining to one or more of the offerings selected for purchase during the user browsing session.

9. The computer-implemented method of claim 1, wherein the one or more deep learning techniques are based at least in part on browsing session data derived from one or more previous user browsing sessions during which one or more users ordered at least one offering.

10. The computer-implemented method of claim 1, wherein the one or more offerings distinct from the at least one particular offering comprises one or more offerings of a distinct offering category as compared to the at least one particular offering.

11. The computer-implemented method of claim 1, wherein the one or more offerings distinct from the at least one particular offering comprises one or more offerings that are supplementary to the at least one particular offering.

12. The computer-implemented method of claim 1, wherein determining the recommendation comprises identifying one or more offerings previously ordered by one or more users belonging to the one or more pre-established procurement user types mapped to the user browsing session.

13. A non-transitory processor-readable storage medium having stored therein program code of one or more software programs, wherein the program code when executed by at least one processing device causes said at least one processing device:

to generate a prediction as to whether a user will order at least one particular offering during a user browsing session of one or more web pages of an enterprise, wherein generating the prediction comprises applying one or more deep learning techniques to browsing session data derived from the user browsing session, and wherein applying the one or more deep learning techniques to the browsing session data comprises processing data pertaining to a sequence of multiple browsing session events, occurring at distinct time instances, using multiple recurrent neural network cells and multiple hidden layers within a recurrent neural network, wherein one or more of the multiple hidden layers comprises a combination of input data at a given time instance and output data from at least one hidden layer associated with at least one previous time instance, and wherein processing comprises:

processing, using a first of the multiple recurrent neural network cells, data and corresponding temporal information pertaining to accessing at least one of the one or more web pages of the enterprise at a first time instance and a percentage of the at least one web page accessed by the user;

processing, using a second of the multiple recurrent neural network cells, data and corresponding temporal information pertaining to viewing the at least one particular offering on the at least one web page at a second time instance subsequent to the first time instance; and processing, using a third of the multiple recurrent neural network cells, data and corresponding temporal information pertaining adding the at least one particular offering to a virtual shopping cart associated with the one or more web pages of the enterprise at a third time instance subsequent to the second time instance;

to map the user browsing session to one or more of multiple pre-established procurement user types by comparing the browser session data to data pertaining to the multiple pre-established procurement user types, wherein comparing comprises calculating a distance from each of one or more data points within the browser session data to the mean data point associated with each the of multiple pre-established procurement user types using at least one multivariate support vector machine;

to determine a recommendation of one or more offerings distinct from the at least one particular offering, wherein determining the recommendation is based at least in part on the generated prediction and the mapping of the user browsing session to one or more of the multiple pre-established procurement user types, and wherein determining the recommendation based at least in part on the mapping comprises identifying at least one offering purchased by at least one user associated with at least one of the multiple pre-established procurement user types upon a determination that at least one of the calculated distances, related to the at least one pre-established procurement user type, is less than a given amount; and to output, within the user browsing session, the recommendation to at least the user.

14. The non-transitory processor-readable storage medium of claim 13, wherein determining the recommendation comprises identifying one or more offerings previously ordered by one or more users belonging to the one or more pre-established procurement user types mapped to the user browsing session.

15. The non-transitory processor-readable storage medium of claim 13, wherein the one or more deep learning techniques are based at least in part on browsing session data derived from one or more previous user browsing sessions during which one or more users ordered at least one offering.

16. The non-transitory processor-readable storage medium of claim 13, wherein the one or more offerings distinct from the at least one particular offering comprises at least one of one or more offerings of a distinct offering category as compared to the at least one particular offering and one or more offerings that are supplementary to the at least one particular offering.

17. An apparatus comprising:
- at least one processing device comprising a processor coupled to a memory;
- the at least one processing device being configured:
  - to generate a prediction as to whether a user will order at least one particular offering during a user browsing session of one or more web pages of an enterprise, wherein generating the prediction comprises applying one or more deep learning techniques to browsing session data derived from the user browsing session, and wherein applying the one or more deep learning techniques to the browsing session data comprises processing data pertaining to a sequence of multiple browsing session events, occurring at distinct time instances, using multiple recurrent neural network cells and multiple hidden layers within a recurrent neural network, wherein one or more of the multiple hidden layers comprises a combination of input data at a given time instance and output data from at least one hidden layer associated with at least one previous time instance, and wherein processing comprises:
    - processing, using a first of the multiple recurrent neural network cells, data and corresponding temporal information pertaining to accessing at least one of the one or more web pages of the enterprise at a first time instance and a percentage of the at least one web page accessed by the user;
    - processing, using a second of the multiple recurrent neural network cells, data and corresponding temporal information pertaining to viewing the at least one particular offering on the at least one web page at a second time instance subsequent to the first time instance; and
    - processing, using a third of the multiple recurrent neural network cells, data and corresponding temporal information pertaining adding the at least one particular offering to a virtual shopping cart associated with the one or more web pages of the enterprise at a third time instance subsequent to the second time instance;
  - to map the user browsing session to one or more of multiple pre-established procurement user types by comparing the browser session data to data pertaining to the multiple pre-established procurement user types, wherein comparing comprises calculating a distance from each of one or more data points within the browser session data to the mean data point associated with each the of multiple pre-established procurement user types using at least one multivariate support vector machine;
  - to determine a recommendation of one or more offerings distinct from the at least one particular offering, wherein determining the recommendation is based at least in part on the generated prediction and the mapping of the user browsing session to one or more of the multiple pre-established procurement user types, and wherein determining the recommendation based at least in part on the mapping comprises identifying at least one offering purchased by at least one user associated with at least one of the multiple pre-established procurement user types upon a determination that at least one of the calculated distances, related to the at least one pre-established procurement user type, is less than a given amount; and
  - to output, within the user browsing session, the recommendation to at least the user.

18. The apparatus of claim 17, wherein determining the recommendation comprises identifying one or more offerings previously ordered by one or more users belonging to the one or more pre-established procurement user types mapped to the user browsing session.

19. The apparatus of claim 17, wherein the one or more deep learning techniques are based at least in part on browsing session data derived from one or more previous user browsing sessions during which one or more users ordered at least one offering.

20. The apparatus of claim 17, wherein the one or more offerings distinct from the at least one particular offering comprises at least one of one or more offerings of a distinct offering category as compared to the at least one particular offering and one or more offerings that are supplementary to the at least one particular offering.

* * * * *

UNITED STATES PATENT AND TRADEMARK OFFICE
CERTIFICATE OF CORRECTION

PATENT NO. : 11,188,930 B2
APPLICATION NO. : 16/046402
DATED : November 30, 2021
INVENTOR(S) : Venkata Chandra Sekar Rao et al.

It is certified that error appears in the above-identified patent and that said Letters Patent is hereby corrected as shown below:

In the Claims

In Claim 1, Column 12, Lines 54-60, replace:
"processing, using a third of the multiple recurrent neural network cells, data and corresponding temporal information pertaining adding the at least one particular offering to a virtual shopping cart associated with the one or more web pages of the enterprise at a third time instance subsequent to the second time instance;"
With:
-- processing, using a third of the multiple recurrent neural network cells, data and corresponding temporal information pertaining to adding the at least one particular offering to a virtual shopping cart associated with the one or more web pages of the enterprise at a third time instance subsequent to the second time instance; --

In Claim 13, Column 14, Lines 35-41, replace:
"processing, using a third of the multiple recurrent neural network cells, data and corresponding temporal information pertaining adding the at least one particular offering to a virtual shopping cart associated with the one or more web pages of the enterprise at a third time instance subsequent to the second time instance;"
With:
-- processing, using a third of the multiple recurrent neural network cells, data and corresponding temporal information pertaining to adding the at least one particular offering to a virtual shopping cart associated with the one or more web pages of the enterprise at a third time instance subsequent to the second time instance; --

In Claim 17, Column 16, Lines 1-7, replace:
"processing, using a third of the multiple recurrent neural network cells, data and corresponding temporal information pertaining adding the at least one particular offering to a virtual shopping cart associated with the one or more web pages of the enterprise at a third time instance subsequent to the second time instance;"

Signed and Sealed this
Twenty-sixth Day of September, 2023

*Katherine Kelly Vidal*

Katherine Kelly Vidal
*Director of the United States Patent and Trademark Office*

With:
-- processing, using a third of the multiple recurrent neural network cells, data and corresponding temporal information pertaining to adding the at least one particular offering to a virtual shopping cart associated with the one or more web pages of the enterprise at a third time instance subsequent to the second time instance; --